United States Patent
Sarabandi et al.

(10) Patent No.: US 12,334,638 B2
(45) Date of Patent: Jun. 17, 2025

(54) LOW-PROFILE PASSIVE REFLECTORS FOR RADAR DETECTION OF ROAD MARKINGS

(71) Applicant: THE REGENTS OF THE UNIVERSITY OF MICHIGAN, Ann Arbor, MI (US)

(72) Inventors: Kamal Sarabandi, Ann Arbor, MI (US); Tanner Douglas, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 318 days.

(21) Appl. No.: 18/074,706

(22) Filed: Dec. 5, 2022

(65) Prior Publication Data
US 2024/0186714 A1 Jun. 6, 2024

(51) Int. Cl.
| | |
|---|---|
| *H01Q 15/14* | (2006.01) |
| *F41J 2/00* | (2006.01) |
| *H01Q 1/32* | (2006.01) |
| *H01Q 9/42* | (2006.01) |
| *H01Q 19/10* | (2006.01) |
| *H01Q 21/00* | (2006.01) |
| *H01Q 21/06* | (2006.01) |

(52) U.S. Cl.
CPC .............. *H01Q 15/14* (2013.01); *F41J 2/00* (2013.01); *H01Q 1/3233* (2013.01); *H01Q 9/42* (2013.01); *H01Q 19/104* (2013.01); *H01Q 21/0043* (2013.01); *H01Q 21/06* (2013.01)

(58) Field of Classification Search
CPC ...... H01Q 15/14; H01Q 21/0043; H01Q 9/42; H01Q 19/104; H01Q 21/06; H01Q 1/3233; F41J 2/00; G01S 13/767; G01S 13/91
See application file for complete search history.

(56) References Cited

FOREIGN PATENT DOCUMENTS

| WO | WO-2016089464 A1 * | 6/2016 | ............. F41G 7/008 |
|---|---|---|---|
| WO | WO-2019145911 A2 * | 8/2019 | |

* cited by examiner

*Primary Examiner* — Donald J Wallace
*Assistant Examiner* — Ashley Brown Raynal
(74) *Attorney, Agent, or Firm* — Harness, Dickey & Pierce, P.L.C.

(57) ABSTRACT

Low-profile radar reflectors are provided for reradiating when illuminated by a vertically-polarized incident wave generated by an automotive radar. One example reflector includes a ground plane, a substrate having a top surface and a bottom surface, and radiating elements positioned on the substrate. Each radiating element includes opposing vertical metallic side segments connected to the ground plane, and a horizontal metallic segment extending between the opposing vertical metallic side segments and along the top surface of the substrate. The horizontal metallic segment of each radiating element has a defined length such that, when the radiating element is illuminated by a vertically-polarized incident wave from an automotive radar, each radiating element is at its resonance causing currents in the opposing vertical metallic side segments to flow in the same direction and reradiates back to the automotive radar. Other example low-profile reflectors and methods of fabricating low-profile reflectors are also disclosed.

16 Claims, 11 Drawing Sheets

LOW-PROFILE PASSIVE REFLECTORS FOR RADAR DETECTION OF ROAD MARKINGS

FIELD

The present disclosure relates to low-profile passive reflectors for radar detection of road markings.

BACKGROUND

This section provides background information related to the present disclosure which is not necessarily prior art.

Vehicles often include advanced driver assistance systems (ADAS) and autonomous technology that rely on sensors such as ultrasonic sensors, cameras, radars, magnetic sensors, and lidar sensors for blind spot detection, adaptive cruise control, traffic sign recognition, lane departure warnings, and autonomous parking. Cameras in vehicles can distinguish target properties such as color and texture on and along a road. To perform a similar task, other sensors such as magnetic sensors and radars may be employed. For example, radars may be used for various applications such as blind spot detection, adaptive cruise control, and autonomous parking without additional infrastructure. Some studies have suggested using trihedral-shaped reflectors embedded in the road in connection with radars. Magnetic sensors rely on magnets or magnetic materials integrated into the road surface.

SUMMARY

This section provides a general summary of the disclosure, and is not a comprehensive disclosure of its full scope or all of its features.

According to one aspect of the present disclosure, a low-profile radar reflector configured to reradiate when illuminated by a vertically-polarized incident wave generated by an automotive radar is provided. The low-profile radar reflector includes a ground plane, a dielectric substrate having a top surface and a bottom surface opposing the top surface, and a plurality of radiating elements positioned on the dielectric substrate. Each radiating element includes opposing vertical metallic side segments connected to the ground plane, and a horizontal metallic segment extending between the opposing vertical metallic side segments and along the top surface of the dielectric substrate. The horizontal metallic segment of each radiating element has a defined length such that, when the radiating element is illuminated by the vertically-polarized incident wave from the automotive radar, each radiating element is at its resonance causing currents in the opposing vertical metallic side segments to flow in the same direction and reradiates back to the automotive radar.

According to another aspect of the present disclosure, a method of fabricating a plurality of radiating elements of a low-profile radar reflector is provided. The method includes spinning a photoresist material onto a ground plane; forming a plurality of dielectric strips from the photoresist material on the ground plane, thereby exposing portions of the ground plane; applying a shadow mask on top of the plurality of dielectric strips, the shadow mask including a plurality of slots extending perpendicular to the plurality of dielectric strips; forming, by physical vapor deposition at a first defined angle, a first vertical metallic side segment of each radiating element to one side surface of each dielectric strip and a first portion of a horizontal metallic segment of each radiating element to a top surface of each dielectric strip through the plurality of slots of the shadow mask, thereby connecting the first side vertical metallic segment of each radiating element to the ground plane; forming, by physical vapor deposition at a second defined angle, a second vertical metallic side segment of each radiating element to another side surface of each dielectric strip and a second portion of the horizontal metallic segment of each radiating element to the top surface of each dielectric strip through the plurality of slots of the shadow mask, thereby connecting the second vertical metallic side segment of each radiating element to the ground plane and connecting the first portion and the second portion of the horizontal metallic segment; and removing the shadow mask.

According to another aspect of the present disclosure, a method of fabricating a plurality of radiating elements of a low-profile radar reflector on a dielectric substrate having a top surface and a bottom surface. The method includes inserting a plurality of vertical metallic side segments through vias extending between the top surface and the bottom surface of the dielectric substrate, positioning a ground plane on the bottom surface of the dielectric substrate, thereby connecting the ground plane and the plurality of vertical metallic side segments, and positioning a plurality of horizontal metallic segments on the top surface of the dielectric substrate, each horizontal metallic segment connecting a pair of vertical metallic side segments of the plurality of vertical metallic side to form the plurality of radiating elements.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
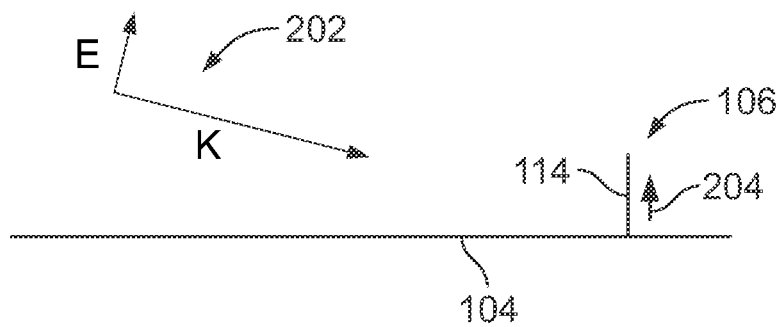
Figure 2B:
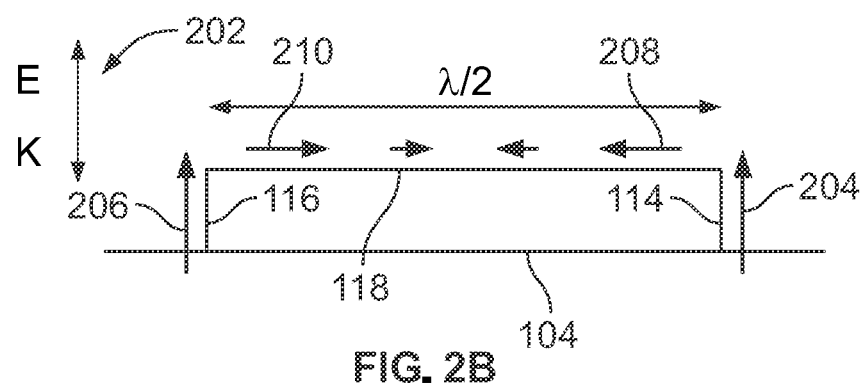

FIGS. 2A-B are diagrams of an incident wave provided to a radiating element at a high incidence angle and resulting current flow in the radiating element, according to another example embodiment.

Figure 2C:
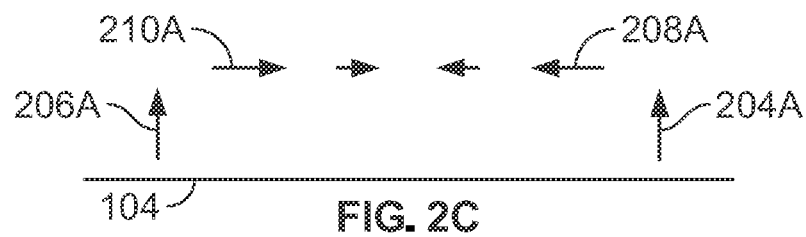
Figure 2D:
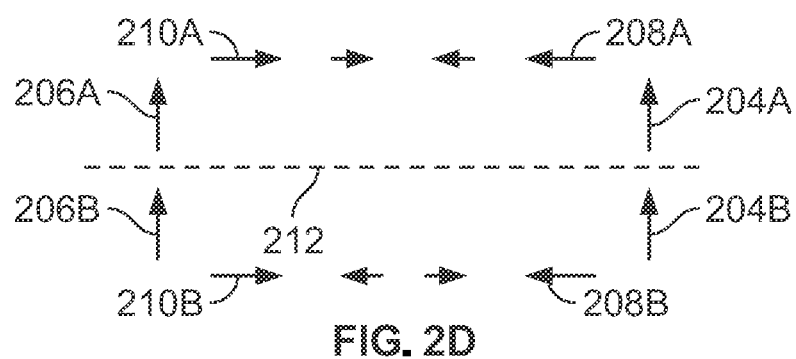
Figure 2E:
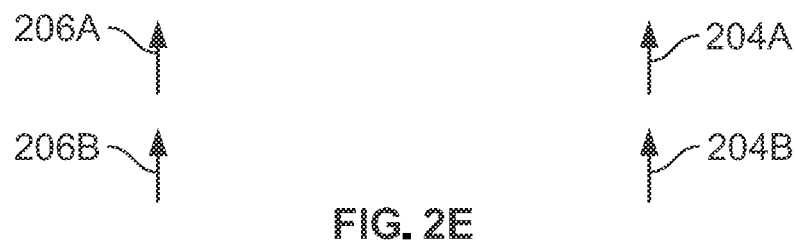

FIGS. 2C-E are diagrams of an image theory applied with respect to the radiating element of FIGS. 2A-B, according to another example embodiment.

Figure 3A:
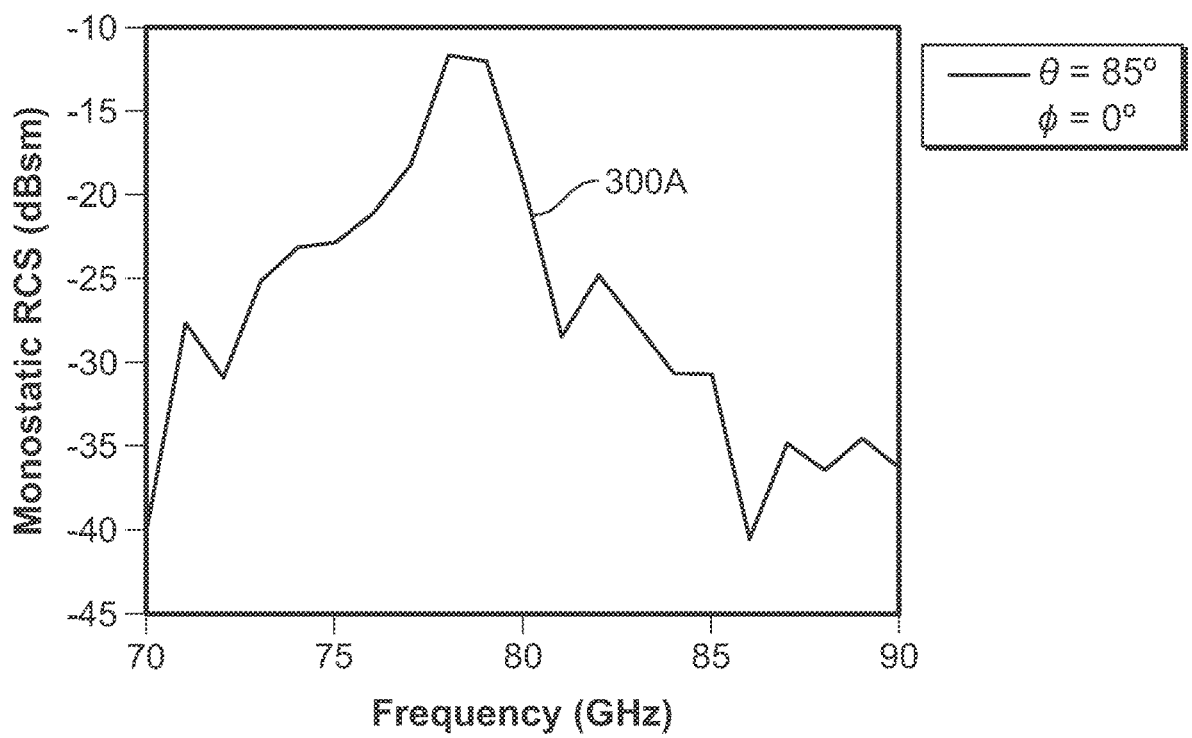
Figure 3B:
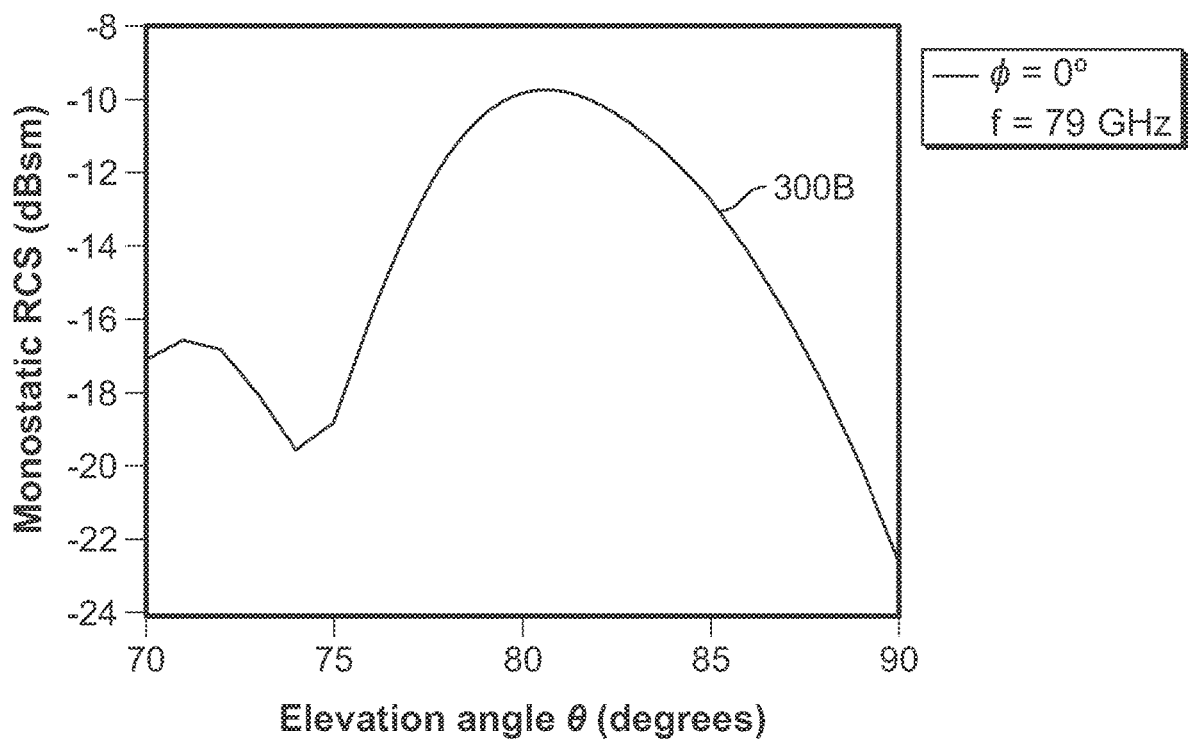
Figure 3C:
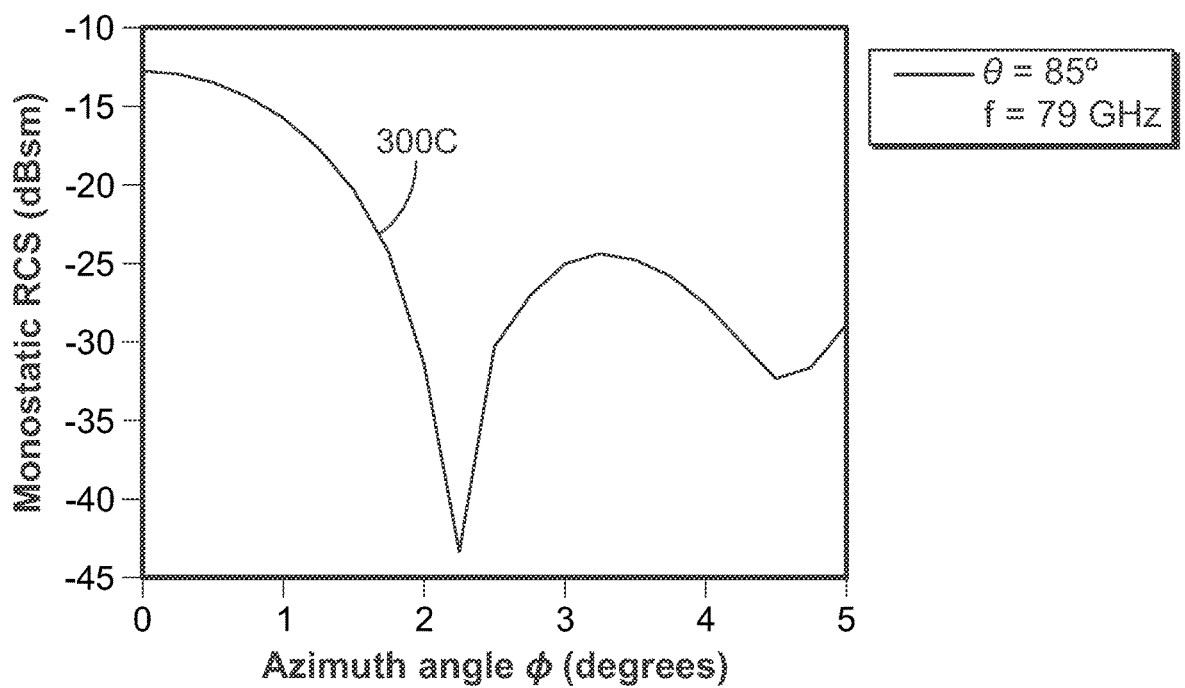

FIGS. 3A-C are graphs showing a monostatic radar cross-section (RCS) of a reflector as a function of frequency, an incidence angle, and an azimuth angle, according to other example embodiments.

Figure 4A:
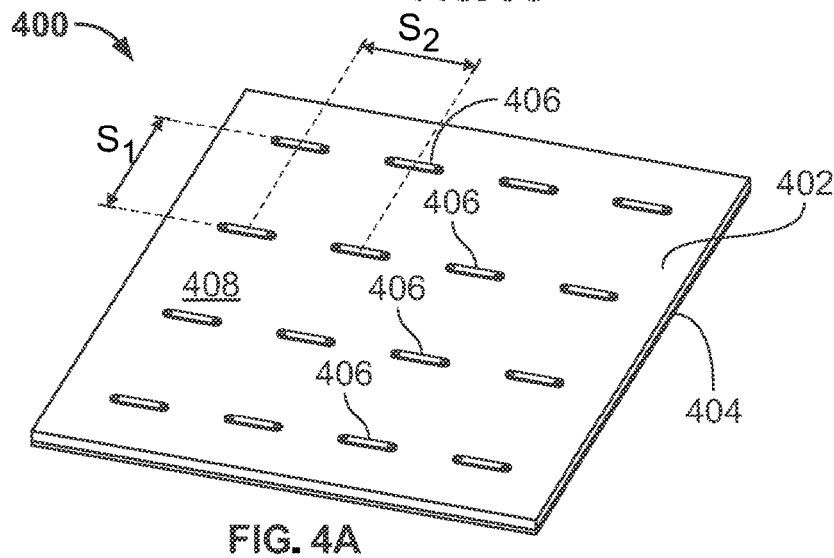

FIG. 4A is a prescriptive view of a low-profile radar reflector including radiating elements, according to another example embodiment.

Figure 4B:
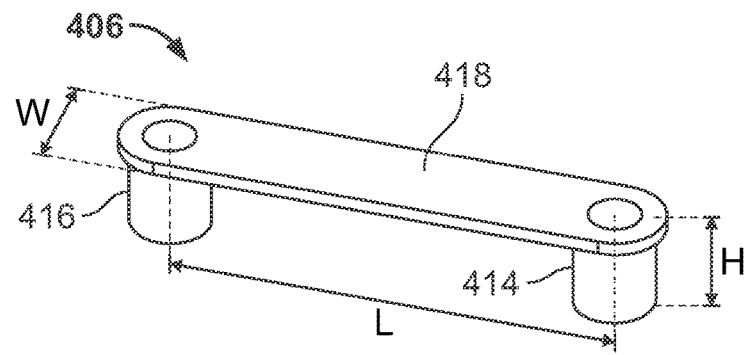

FIG. 4B is a prescriptive view of one of the radiating elements of FIG. 4A.

Figure 5A:
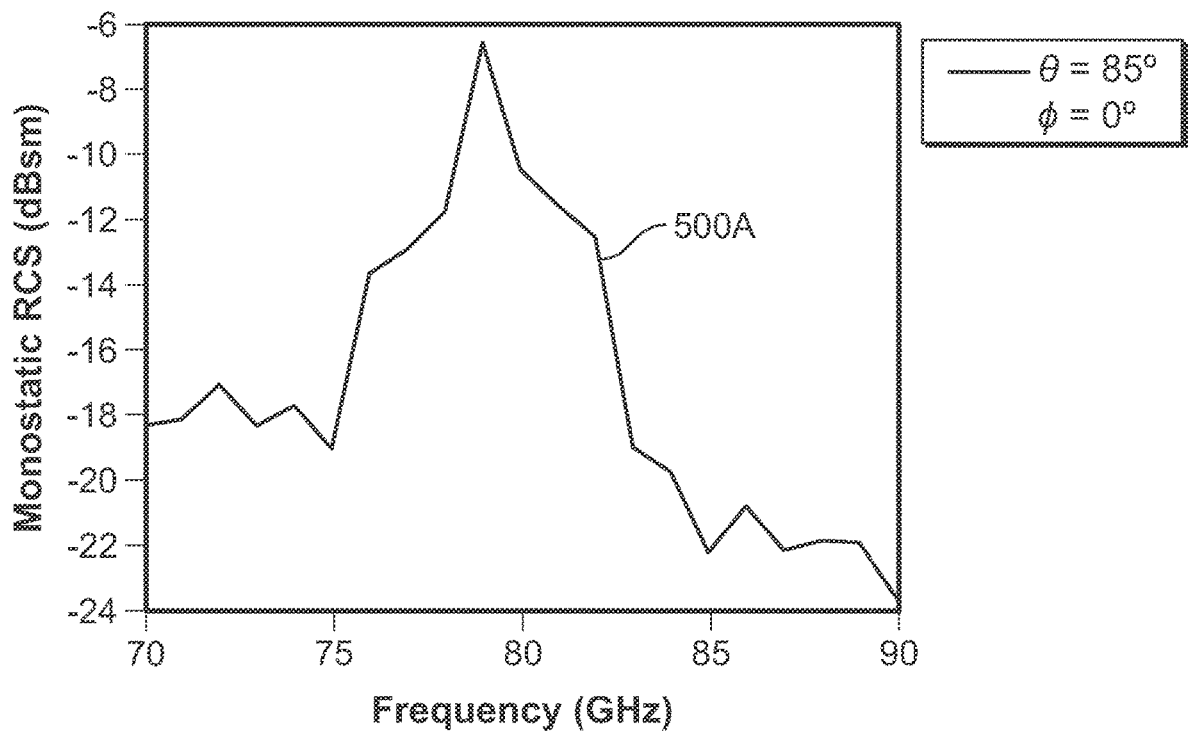
Figure 5B:
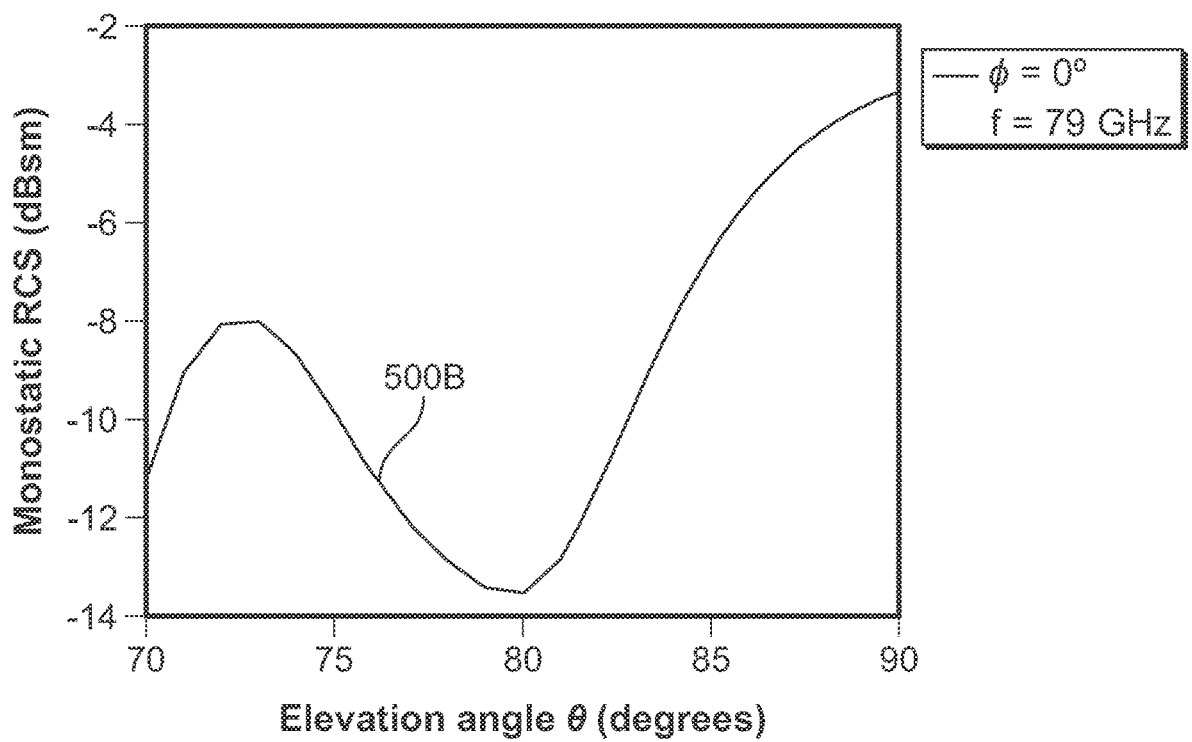

FIGS. 5A-B are graphs showing a monostatic RCS of a reflector as a function of frequency and an incidence angle, according to other example embodiments.

Figure 6:
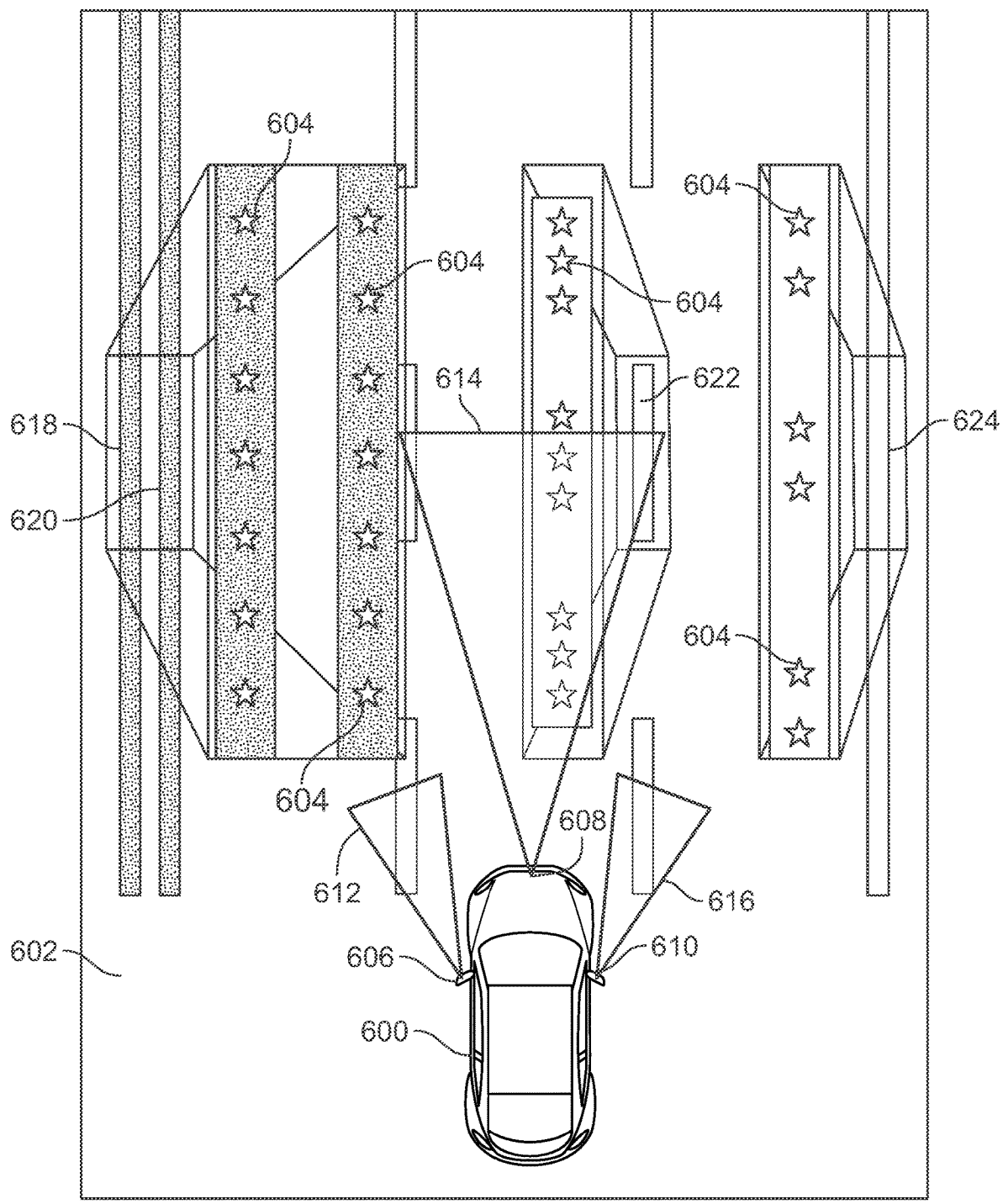

FIG. 6 is a diagram showing a vehicle on a surface of a road and multiple radar reflectors according to another example embodiment.

Figure 7:
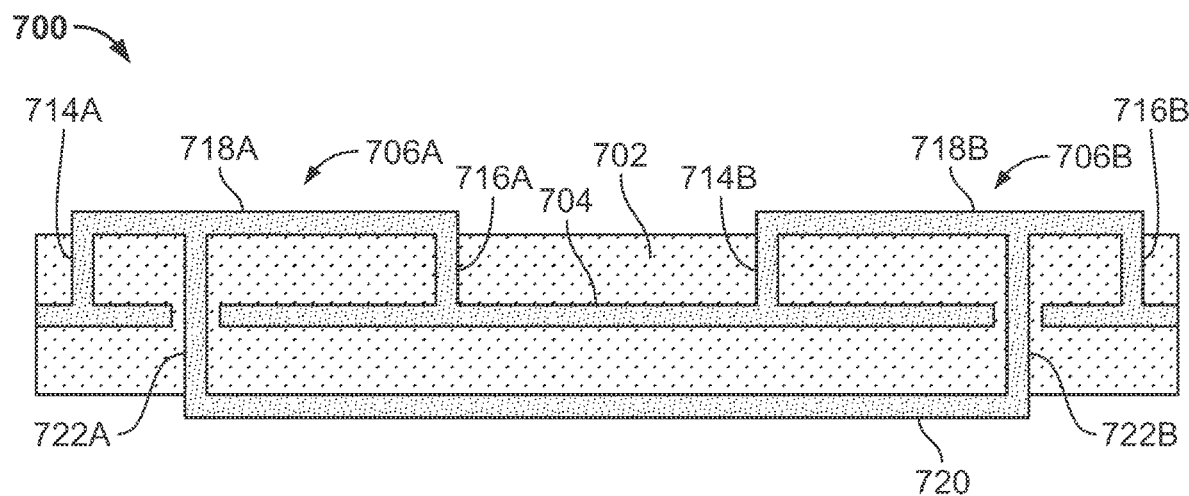

FIG. 7 is a side view of a low-profile radar reflector including radiating elements having inner vertical segments, according to another example embodiment.

Figure 8:
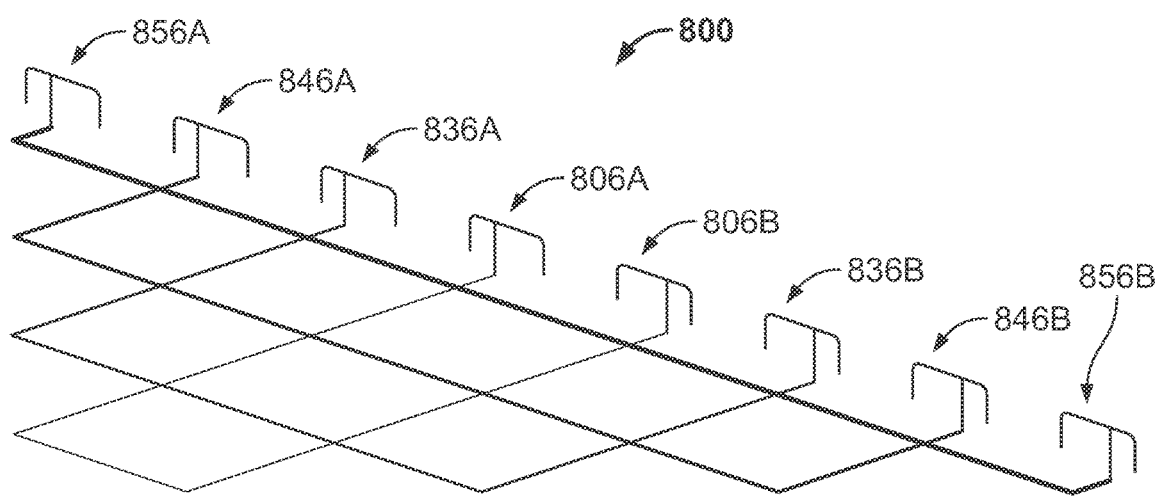

FIG. 8 is a prescriptive view of a low-profile radar reflector including radiating elements, according to another example embodiment.

FIGS. 9A-H are diagrams of a fabrication process for forming a low-profile radar reflector, according to another example embodiment.

Figure 9A:
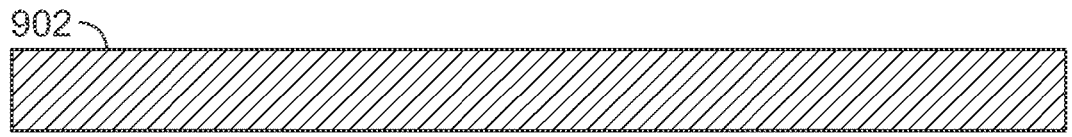
Figure 9B:
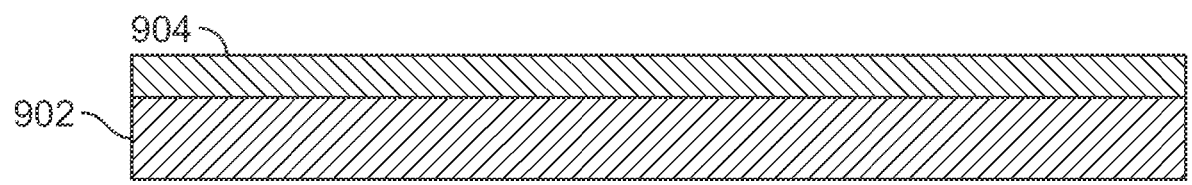
Figure 9C:
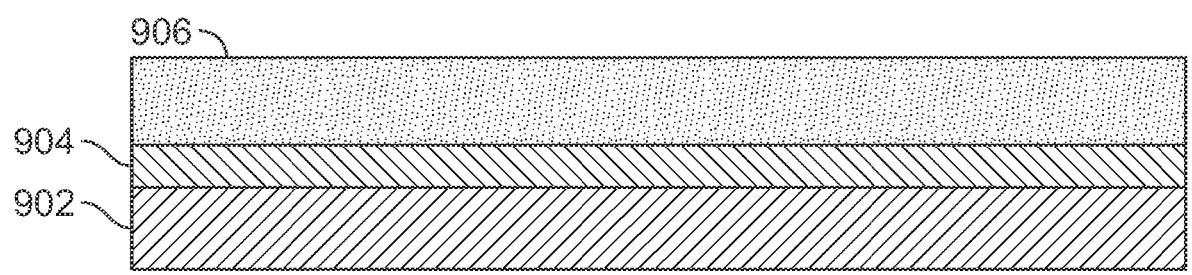
Figure 9D:
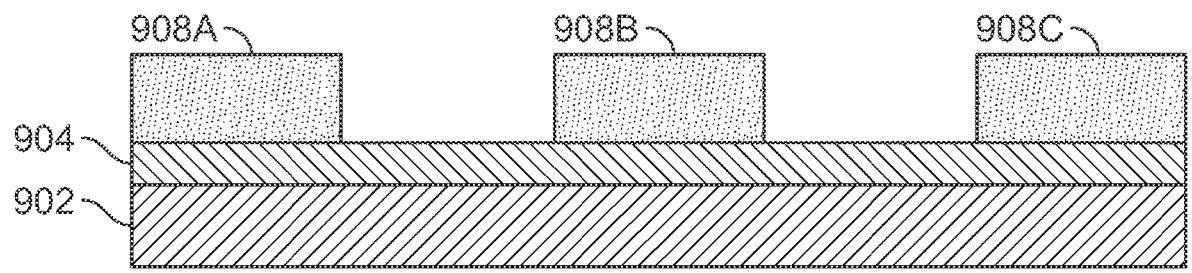
Figure 9E:
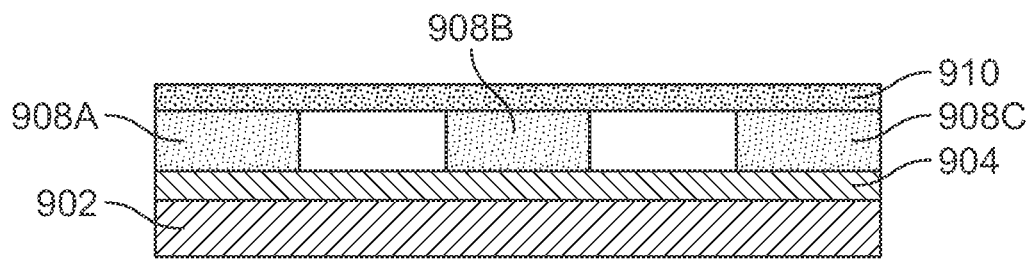
Figure 9F:
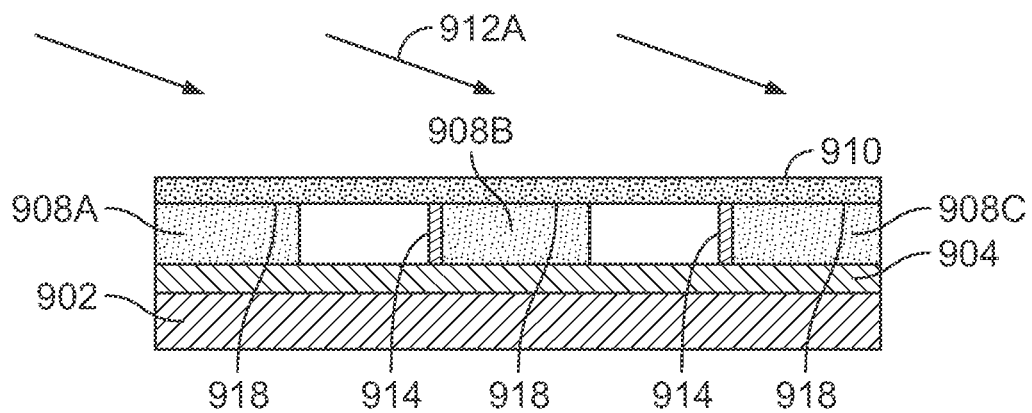
Figure 9G:
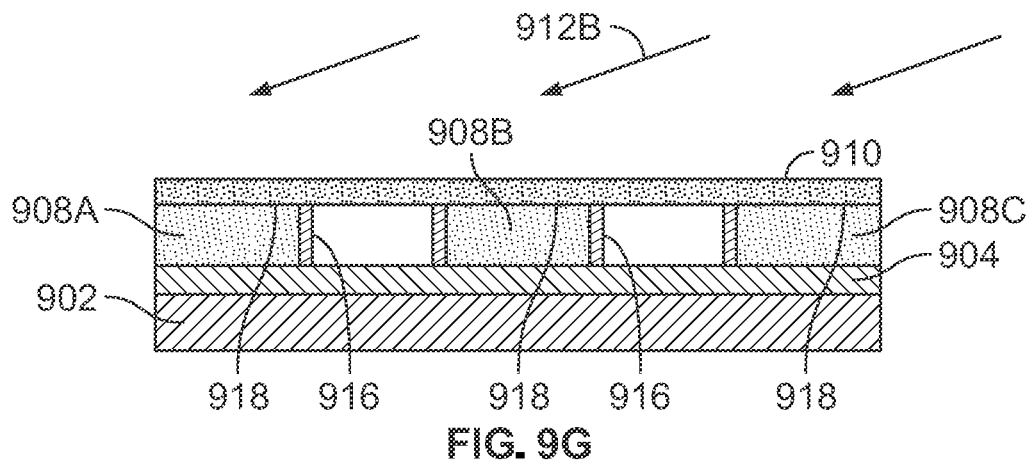
Figure 9H:
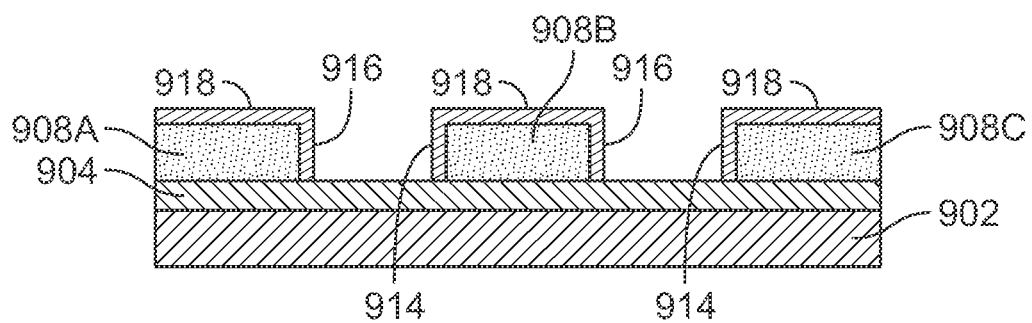
Figure 10:
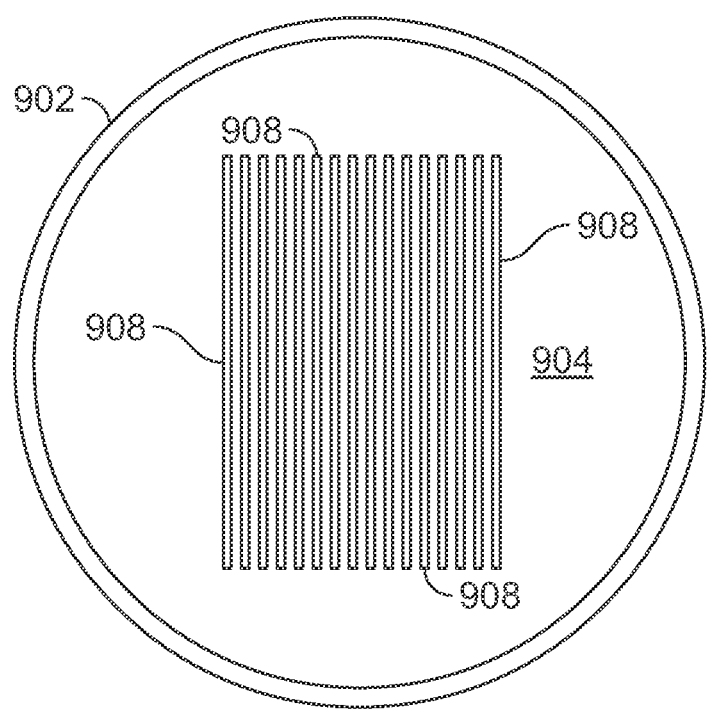

FIG. 10 is a top view of dielectric strips formed in the fabrication process of FIGS. 9A-H.

Figure 11:
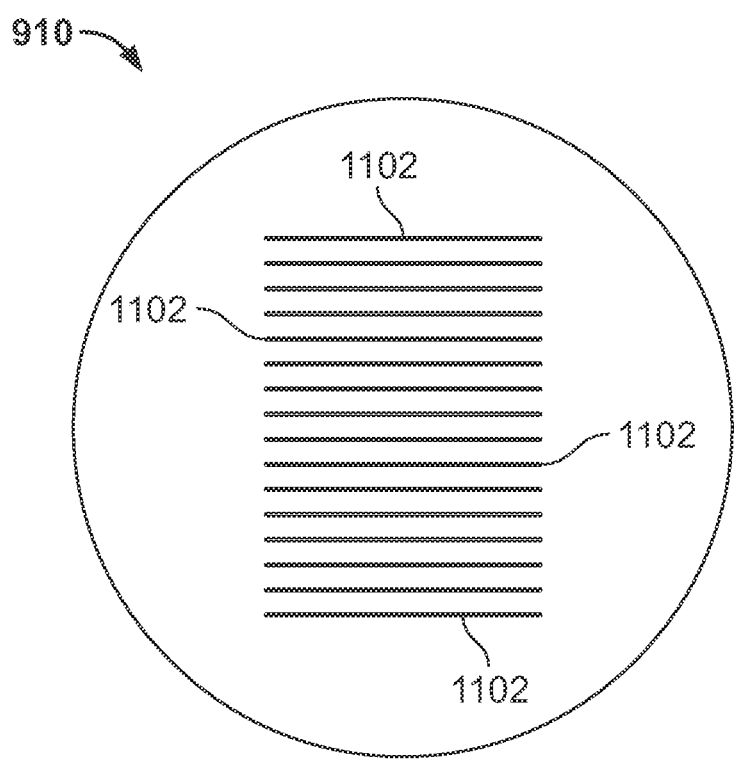

FIG. 11 is a top view of a shadow mask implemented in the fabrication process of FIGS. 9A-H.

Corresponding reference numerals indicate corresponding parts and/or features throughout the several views of the drawings.

DETAILED DESCRIPTION

Automotive radars constitute an important class of sensors in ADAS and autonomous vehicle technology. Such radars are often the primary sensor system for various ADAS features such as blind spot detection and adaptive cruise control. In such examples, radars can detect various objects like vehicles, pedestrians, etc. While radars offer a number of benefits including precise range and velocity measurement and polarimetric capability, there are applications to which radars are not well suited. For example, cameras are better at distinguishing target properties such as color and texture, making them useful in ADAS technologies such as traffic sign recognition, lane departure warning, and autonomous parking. However, cameras suffer performance degradation in poor visibility conditions caused by inclement weather. Since attenuation due to atmospheric gas constituents, rain, and fog is relatively small at millimeter-wave frequencies, radars operate consistently in any weather conditions. Further, while radars may rely on trihedral-shaped reflectors for detecting road markings, such trihedral-shaped reflectors are bulky and have a height of 4 mm or more. As such, the use of trihedral-shaped reflectors in such applications are impractical.

Uniquely, the reflectors herein leverage low-profile, passive radiating elements having staple-like shapes and arranged for placement onto a road surface and/or embedment into lane paint and/or lane stickers on the road surface, as means for detection by forward-looking automotive radars. For example, the radiating elements herein include opposing vertical metallic side segments electrically connected to a ground plane, and a horizontal metallic segment extending between the opposing vertical metallic side segments and along a surface of one or more strips of a dielectric substrate. The low-profile reflectors with their unique radiating elements provide a large RCS (or radar signature), thereby enabling forward-looking automotive radars to easily detect the reflectors regardless of weather conditions and vehicles to identify road markings such as lane dividers, stop lines, etc. Additionally, due to the low-profile configuration, the reflectors experience little to no impact or risk of damage from traffic. Further, the reflectors are cost-effective to produce, thereby enabling the employment of massive quantities across roadways (e.g., highways, etc.).

Example embodiments will now be described more fully with reference to the accompanying drawings.

Figure 1A:
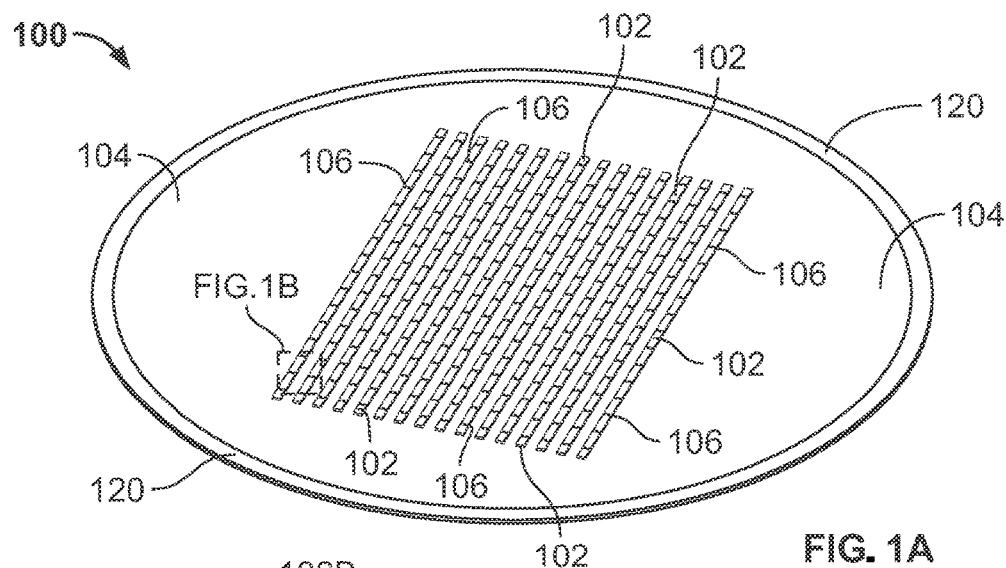
FIG. 1A is a prescriptive view of a low-profile radar reflector including a dielectric substrate with sixteen strips and sixteen radiating elements per strip, according to one example embodiment of the present disclosure.
Figure 1B:
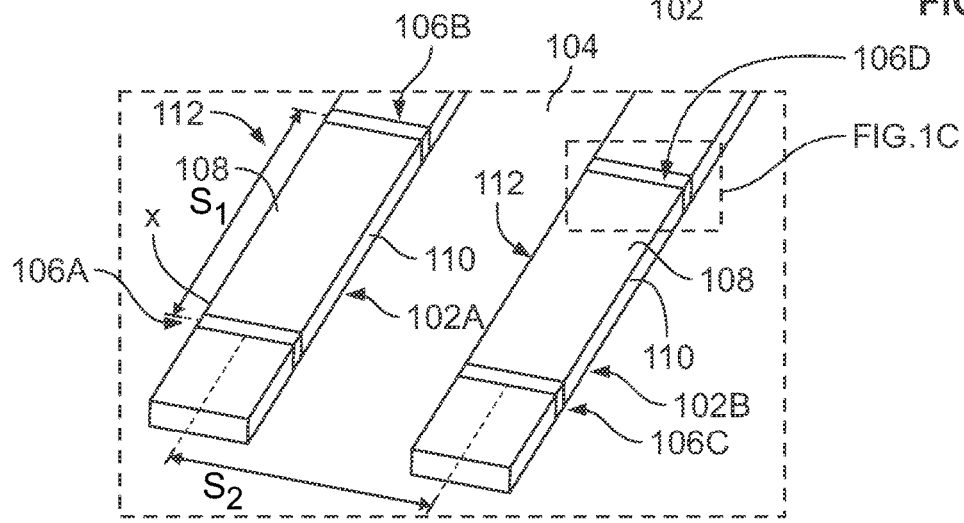
FIG. 1B is an enlarged prescriptive view of a portion of the low-profile radar reflector of FIG. 1A.
Figure 1C:
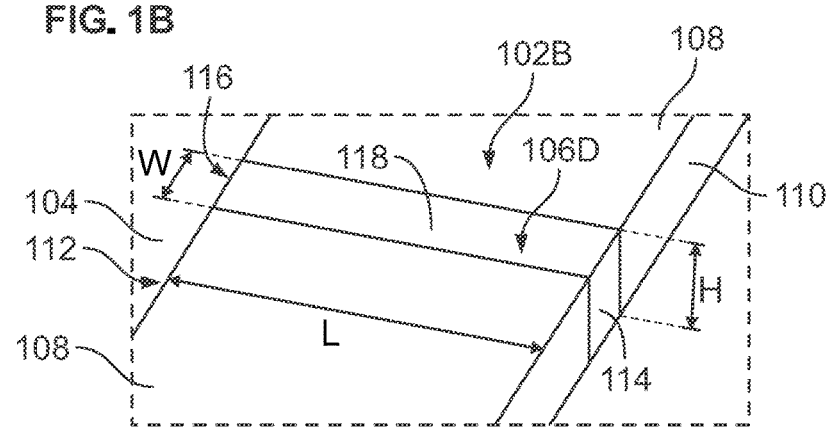
FIG. 1C is an enlarged prescriptive view of a portion of the low-profile radar reflector of FIG. 1B.

FIGS. 1A-C illustrate an example low-profile radar reflector 100 for reradiating when illuminated by a vertically-polarized incident wave generated by a forward-looking automotive radar. Although the reflector 100 is presented in one specific arrangement in FIGS. 1A-C, other embodiments may include the reflector 100 arranged otherwise depending on, for example, the configuration of automotive radars, road surfaces, lane paint and/or lane stickers on road surfaces, etc.

As shown in FIG. 1A, the reflector 100 generally includes multiple dielectric strips 102, a ground plane 104 positioned beneath the strips 102, and multiple radiating elements 106 positioned on the strips 102 and electrically connected to the ground plane 104. The strips 102 may be a part of and/or collectively referred to as a dielectric substrate. As shown, the strips 102 are separated from and extend adjacent to each other in a parallel configuration, thereby forming a corrugated like shape with the ground plane 104. In the illustrated embodiment, the reflector 100 includes sixteen strips 102 and sixteen radiating elements 106 positioned on each strip 102, forming a sixteen-by-sixteen two-dimensional array. With that said, it should be appreciated that the reflector 100 may include more or less strips 102 and/or radiating elements 106, may form another shape, etc. For example, the reflector 100 may include one strip, two, four, five, ten, twenty, etc. strips, and/or two, three, four, seven, twelve, twenty radiating elements on each strip.

As shown in FIG. 1A, the reflector 100 is implemented with a substrate 120 positioned beneath the ground plane 104. More specifically, the substrate 120 is arranged to extend along the entire bottom surface of the ground plane 104 and beyond an outer perimeter of the ground plane 104. In various embodiments, the substrate 120 may be a silicon wafer or another suitable material. If, for example, the substrate 120 is a silicon wafer, standard semiconductor processes can be utilized to deposit the ground plane 104 onto the substrate 120 if desired.

Each strip 102 generally includes a top surface, a bottom surface, and two opposing side surfaces. The ground plane 104 is positioned on the bottom surface of each strip 102. Specifically, and as shown best in FIGS. 1B-C, strips 102A, 102B (of the substrate in FIG. 1A) include a top surface 108, a bottom surface (not visible), and two opposing side surfaces 110, 112 extending between the top surface 108 and the bottom surface.

Each radiating element 106 generally includes opposing side segments and a middle segment. Specifically, and as shown best in FIGS. 1B-C, radiating elements 106A-D (of the radiating elements 106 in FIG. 1A) each include opposing side segments (e.g., vertical segments) 114, 116, and a middle segment (e.g., a horizontal segment) 118 extending along the top surface 108 of the strips 102A, 102B. The opposing side segments 114, 116 of each radiating element 106A, 106B, 106C, 106D are electrically connected to the ground plane 104. More specifically, the side segments 114, 116 extend along the side surfaces 110, 112, respectively, of the strips 102A, 102B and between the middle segment 118 and the ground plane 104. With this arrangement, each radiating element 106 forms a staple-like shape (e.g., an "Π" shape, etc.).

In various embodiments, each radiating element 106 may function as two monopole antenna structure. For example, the side segment 114 and a portion of the middle segment 118 of one radiating element 106 may function as one monopole antenna structure, and the side segment 116 and the remaining portion of the middle segment 118 of the radiating element 106 may function as another monopole antenna structure. In such examples, the monopole antenna structures extend upward from the ground plane 104 and then connect (along the top surfaces 108 of the strips 102), forming the staple-like geometry. In other examples, each radiating element 106 may function as other suitable radiating structures.

The strips 102, the ground plane 104, and the radiating elements 106 may include various materials. For example, the strips 102 may be photoresist material such as SU-8 photoresist and/or another suitable dielectric material. In some examples, the SU-8 photoresist may have a relative permittivity ($\epsilon r$) of about 3.0 and a dielectric loss (tan δ) of about 0.04. The ground plane 104 may be gold, aluminum, titanium, alloys thereof, and/or another suitable metallic material (including their alloys). The radiating elements 106 may be any suitable electrically conductive metallic material such as copper, aluminum, silver, gold, and/or alloys thereof.

In various embodiments, the radiating elements 106 may be designed and arranged to achieve a low-profile configuration of the reflector 100 while reradiating at a desirable RCS level when illuminated by a wave at a high incidence angle and at the 77 GHz automotive radar band (76 GHz-81 GHz), as is typically produced by a forward-looking automotive radar directed at the road ahead of the vehicle. As further explained below, the dimensions of each radiating element 106 and the spacing between adjacent radiating elements 106 may be selected to achieve such results.

For example, adjacent pairs of radiating elements 106 on the same strip 102 are spaced apart by a defined distance to enhance radiation in the backscatter direction. More specifically, and as shown best in FIG. 1B, adjacent radiating elements 106A, 106B on the strip 102A are spaced apart by a distance S1. In such examples, the distance S1 is defined as the length between a midpoint of one radiating element 106 (e.g., the radiating element 106A in FIG. 1B) and a midpoint of another adjacent radiating element 106 (e.g., the radiating element 106B in FIG. 1B). The distance S1 between the radiating elements 106A, 106B (and other adjacent pairs of radiating elements on the strip 102A or another one of the strips 102) may be a multiple of a half of a wavelength ($\lambda/2$) when the vertically-polarized incident wave has a frequency between 76 GHz and 81 GHz and an incidence angle between 77° and 86°. For example, the distance S1 may be one wavelength (λ) when the vertically-polarized incident wave has a frequency between 76 GHz and 81 GHz and an incidence angle between 77° and 86°. For instance, as one example, the distance S1 be about 3,800 μm when the vertically-polarized incident wave has a frequency of 79 GHz and an incidence angle between 85°. In other examples, the distance S1 may be another suitable value depending on the frequency of the vertically-polarized incident wave.

Additionally, pairs of radiating elements 106 on adjacent strips 102 are spaced apart by a defined distance. More specifically, and as shown best in FIG. 1B, radiating elements 106A, 106C on adjacent strips 102A, 102B are spaced apart by a distance S2. In such examples, the distance S2 is defined as the length between midpoints of adjacent radiating elements 106 (e.g., the radiating elements 106A, 106C in FIG. 1B) on adjacent strips 102. The distance S2 between the radiating elements 106A, 106C (and other adjacent pairs of radiating elements on adjacent strips 102) may be about half of a wavelength ($\lambda/2$) or more when the vertically-polarized incident wave has a frequency between 76 GHz and 81 GHz and an incidence angle between 77° and 86°. For instance, as one example, the distance S2 be about 1,600 μm when the vertically-polarized incident wave has a frequency of 79 GHz and an incidence angle between 85°. In other examples, the distance S2 may be another suitable value such as about 2,600 μm, etc. depending on the frequency of the vertically-polarized incident wave.

Further, the dimensions of each radiating element 106 may be selected to achieve such desirable results. For example, each radiating element 106 may have a total length of a half of a wavelength ($\lambda/2$) or multiples thereof. As such, when each radiating element 106 is illuminated by the vertically-polarized incident wave, each radiating element 106 is at its resonance. Further, testing has shown that the height and the width of each radiating element 106 have a relatively small impact on the RCS. As such, the height and the width of the radiating element 106 may be optimized together to ensure a desired resonant response (as further explained below).

For instance, the height of each radiating element 106 (e.g., a height H of the radiating element 106D in FIG. 1C) relative to the ground plane 104 may be about 260 μm or less when the vertically-polarized incident wave has a frequency between 76 GHz and 81 GHz and an incidence angle between about 77° and about 86°. For example, the height of each radiating element 106 (e.g., the height of the side segments 114, 116) may be between about 200 μm and about 260 μm. In some embodiments, the height may be about 250 μm. With this arrangement, the total height of the reflector 100 may be about 0.5 mm or less, thereby achieving a low-profile configuration (e.g., a height much smaller than the wavelength such as, for example, less than a tenth of a wavelength, etc.).

Additionally, the width of each radiating element 106 (e.g., a width W of the radiating element 106D in FIG. 1C) may be any suitable value. In some examples, the width of each radiating element 106 is set based on a minimum width that can be achieved through a fabrication process used to make the radiating element. For example, the width may be about 250 μm, etc. when the vertically-polarized incident wave has a frequency between 76 GHz and 81 GHz and an incidence angle between about 77° and about 86°.

Further, the length of the middle segment 118 between the opposing side segments 114, 116 of each radiating element 106 (e.g., a length L of the radiating element 106D in FIG. 1C) may be about half of a wavelength ($\lambda/2$) when the vertically-polarized incident wave has a frequency between 76 GHz and 81 GHz and an incidence angle between about 77° and about 86°. For instance, as one example, the length of the middle segment 118 may be about 1,000 μm when the vertically-polarized incident wave has a frequency of about 79 GHz and an incidence angle of 85°. In other examples, the length of the middle segment 118 may be another suitable value depending on the frequency of the vertically-polarized incident wave.

The length of the middle segment 118 of each radiating element 106 is selected such that, when the radiating element is illuminated by the vertically-polarized incident wave at a high incidence angle (e.g., between about 77° and about 86°) from the automotive radar, each radiating element 106 is at its resonance causing currents in the opposing side segments 114, 116 to flow in the same direction and reradiates the wave back to the automotive radar. For example, FIGS. 2A-B illustrate example diagrams of an incident wave 202 provided at a high incidence angle generated from an automotive radar and the resulting current flow in one of the radiating elements 106 of FIGS. 1-C when the length of the middle segment 118 is half of a wavelength (λ/2). As shown in FIGS. 2A-B, the incident wave 202 has a vertically-polarized electric field E and a propagation vector K pointing in the direction the wave is travelling. The wave 202 excites significant, resonant current (vertical current) 204, 206 in both side segments 114, 116 (e.g., short monopoles) of the radiating element 106. The resonant current in both side segments 114, 116 flows in the same direction, as shown in FIG. 2B. A resonance of each current (horizontal current) 208, 210 is also induced along the middle segment 118 and flows toward each other, as shown in FIG. 2B. In such examples, the reradiation from the vertical currents is enhanced, while that from the horizontal currents nearly cancels.

For example, FIGS. 2C-E illustrate diagrams of an image theory applied with respect to one of the radiating elements 106 of FIG. 2A when its middle segment 118 is half of a wavelength (λ/2) in length and the incident wave 202 of FIGS. 2A-B is provided. Specifically, FIG. 2C illustrates induced vertical currents 204A, 206A flowing away from the ground plane 104 and induced horizontal currents 208A, 210A in the radiating element (not shown). FIG. 2D then illustrates an image theory of the radiating element formed by the wave 202 (of FIGS. 2A-B) reflecting from the ground plane 104. Specifically, in FIG. 2D, the vertical currents 204A, 206A and the horizontal currents 208A, 210A are above an image plane 212, and vertical currents 204B, 206B (flowing in the same direction as the vertical currents 204A, 206A) and horizontal currents 208B, 210B are below the image plane 212. In such examples, the horizontal (resonance) currents 208A, 210A, 208B, 210B substantially cancel each other, leaving the vertical currents 204A, 206A, 204B, 206B, as shown in FIG. 2E. As a result, reradiation from the vertical currents 204, 206 of FIG. 2B is enhanced through the combination of the vertical currents 204A, 206A, 204B, 206B of FIG. 2D, and in effect produces a reradiation pattern similar to that of a two-element broadside dipole array.

With this enhanced reradiation, the low-profile radar reflector 100 of FIGS. 1A-C exhibits a high RCS when the vertically-polarized incident wave is provided with a frequency between 76 GHz and 81 GHz and an incidence angle between about 77° and about 86°. For instance, testing has shown that the reflector 100 and/or other similar reflectors reradiate at an RCS of −15 dBsm or more when (a) the length of each radiating element (e.g., the length L of the radiating element 106D in FIG. 1C) of the reflector is about 1,000 μm, and (b) the vertically-polarized incident wave has a frequency of 79 GHz and an incidence angle of 85°. For example, FIGS. 3A-C illustrate plots 300A-C showing a monostatic RCS of a reflector as a function of (a) frequency, (b) an incidence angle in the elevation plane, and (c) an azimuth angle, respectively. In the example of FIGS. 3A-C, the center frequency is 79 GHz. As shown, at an incidence angle of 85° in the elevation direction, the reflector exhibits an RCS of −12.7 dBsm with a beamwidth of 2° in the azimuth plane.

FIG. 4A illustrates another example low-profile radar reflector 400 for reradiating when illuminated by a vertically-polarized incident wave generated by a forward-looking automotive radar. Although the reflector 400 is presented in one specific arrangement in FIG. 4A, other embodiments may include the reflector 400 arranged otherwise depending on, for example, the configuration of automotive radars, road surfaces, lane paint and/or lane stickers on road surfaces, etc.

The low-profile radar reflector 400 of FIG. 4A is similar to the reflector 100 of FIGS. 1A-C but is formed with a circuit board (e.g., a printed circuit board, etc.). For example, as shown in FIG. 4A, the reflector 400 generally includes a circuit board (e.g., one or more dielectric substrates) 402, a ground plane 404 positioned beneath the circuit board 402, and multiple radiating elements 406 positioned in the circuit board 402 and electrically connected to the ground plane 404. In some examples, the circuit board 402 may have a relative permittivity ($\varepsilon_r$) of about 3.55 and a dielectric loss (tan δ) of about 0.0027. In the illustrated embodiment, the reflector 400 includes sixteen radiating elements 406 positioned in the circuit board 402, arranged in a four-by-four two-dimensional array. With that said, it should be appreciated that the reflector 400 may include more or less radiating elements 406, radiating elements arranged differently, etc.

As shown in FIG. 4A, each radiating element 406 generally includes opposing side segments (e.g., vertical segments) 414, 416 and a middle segment (e.g., a horizontal segment) 418 extending between the side segments 414, 416. The side segments 414, 416 of each radiating element 406 are inserted and extend through vias of the circuit board 402, and the middle segment 418 is positioned on and extends along a top surface 408 of the of the circuit board 402. The vias may have a diameter of, for example, 200 μm, etc. Then, the opposing side segments 414, 416 of each radiating element 406 are electrically connected to the ground plane 404. With this arrangement, each radiating element 406 of FIGS. 4A-B forms a staple-like shape (e.g., an "Π" shape, etc.) similar to the radiating elements 406 of FIGS. 1A-C.

The radiating elements 406 may be designed and arranged to achieve a low-profile configuration of the reflector 400 while reradiating at a desirable RCS level when illuminated by a wave at high incidence angles and at the 77 GHz automotive radar band (76 GHz-81 GHz). With this in mind, dimensions of each radiating element 406 and the spacing between adjacent radiating elements 406 may be selected to achieve such results.

For example, adjacent pairs of radiating elements 406 in the same row or column are spaced apart by defined distances in a similar manner as the radiating elements 106A, 106B, 106C explained above relative to FIG. 1B. For instance, and as shown in FIG. 4A, adjacent radiating elements 406 in the same column are spaced apart by a distance S1, and adjacent radiating elements 406 in the same row are spaced apart by a distance S2. In such examples, the distances S1, S2 of FIG. 4A may be the same as the distances S1, S2 of FIG. 1B explained above.

The dimensions of each radiating element 406 may be selected to achieve such desirable results when the vertically-polarized incident wave has a frequency between 76 GHz and 81 GHz and an incidence angle between about 77° and about 86°. For example, the width of each radiating element 406 (e.g., a width W of the radiating element 406 in FIG. 4B) may be the same as the width of the radiating elements 106 of FIGS. 1A-C. For instance, the width of each radiating element 406 may be about 250 μm, etc. Additionally, the height of each radiating element 406 (e.g., a height H of the radiating element 406 in FIG. 4B) relative to the ground plane 404 may be about 200 μm, 203 μm, 205 μm, 208 μm, etc. or another suitable value, thereby ensuring the reflector 400 has a low-profile configuration. Further, the length of each radiating element 406 (e.g., a length L of the radiating element 406 in FIG. 4B) may be about half of a wavelength (λ/2) when the frequency is between 76 GHz and 81 GHz. For instance, as one example, the length of each radiating element 406 may be about 1,100 μm when the vertically-polarized incident wave has a frequency of about 79 GHz and an incidence angle of 85°.

Additionally, the length of each radiating element 406 may be selected to induce a similar current configuration as explained above relative to the radiating elements 106 in FIGS. 1A-C and 2A-E. Specifically, the length of each radiating element 406 may be chosen to induce currents (vertical currents) in the opposing side segments 414, 416 to flow in the same direction and currents (horizontal currents) in the middle segment 418 to flow towards each other when the radiating element 406 is illuminated by the vertically-polarized incident wave at a high incidence angle (e.g., between about 77° and about 86°) from an automotive radar. As a result, and as explained above, the reradiation from the vertical currents is enhanced, while that from the horizontal currents nearly cancels.

With this enhanced reradiation, the low-profile radar reflector 400 of FIG. 4A exhibits a high RCS when the vertically-polarized incident wave is provided with a frequency between 76 GHz and 81 GHz and an incidence angle between about 77° and about 86°. For instance, testing has shown that the reflector 400 and/or similar reflectors reradiate at an RCS of greater than −13 dBsm when (a) the length of each radiating element is about 1,100 μm, and (b) the vertically-polarized incident wave has a frequency of 79 GHz and an incidence angle of between about 70° and 90°. For example, FIGS. 5A-B illustrate plots 500A-B showing a monostatic RCS of a reflector as a function of (a) frequency, and (b) an incidence angle in the elevation plane, respectively. In the example of FIGS. 5A-B, at an incidence angle of 85° in the elevation direction and a center frequency of 79 GHz, the reflector exhibits an RCS of −6.6 dBsm.

In various embodiments, the low-profile radar reflectors herein may be embedded into surfaces of roads, lane paint on surfaces of roads, lane stickers on surfaces of roads, etc. For example, FIG. 6 illustrates an example diagram of a vehicle 600 on a surface of a road 602 and multiple radar reflectors 604 (shown as stars). The road 602 may be formed of asphalt, concrete, and/or another suitable material. In the example of FIG. 6, each radar reflectors 604 may be the low-profile radar reflector 100 of FIGS. 1A-C, the low-profile radar reflector 400 of FIG. 4A, etc.

As shown, the vehicle 600 has three forward-looking radars 606, 608, 610 providing vertically-polarized incident waves (represented by shaded areas 612, 614, 616). In other examples, the vehicle 600 may include more or less radars if desired.

The road 602 includes lines 618, 620, 622, 624 extending along the surface of the road 602. The lines 618, 620, 622, 624 may be painted, stickers, etc. on the surface of the road 602. As shown in FIG. 6, the lines 618, 620 are solid, yellow lines, the line 622 is a dashed, white line, and the line 624 is a solid, white line.

In the example of FIG. 6, the radar reflectors 604 are positioned along the lines 618, 620, 622, 624. For example, the radar reflectors 604 may be partly embedded into the surface of the road 602 and beneath paint, stickers, and/or other markings used to form the lines 618, 620, 622, 624. In other examples, the radar reflectors 604 may be partly or completed embedded into the paint, stickers, and/or other markings used to form the lines 618, 620, 622, 624. For instance, the reflectors 604 may be positioned on top of, partially within, flush with, etc. the surface of the road 602 and then covered by the paint, stickers, and/or other markings. Although the radar reflectors 604 are shown as being positioned along the lines 618, 620, 622, 624, it should be appreciated that the any one of the radar reflectors 604 may be positioned in another location along the road 602 such as away from, next to, etc. the lines 618, 620, 622, 624 if desired.

In various embodiments, a collection of the radar reflectors 604 may be particularly arranged to provide an indication of the type of lane marking present along the road 602. In other words, the spatial arrangement of a collection (or an array) of the radar reflectors 604 may be used to encode the type of marking. Specifically, and as shown in FIG. 6, seven radar reflectors 604 equally spaced apart are positioned in the lines 618, 620, three sets of three radar reflectors 604 are positioned in the line 622, and three sets of two radar reflectors 604 are positioned in the line 624. In such examples, the arrays of radar reflectors 604 provide distinct reflection signatures recognizable by a control circuit (e.g., a processor, etc.) in the vehicle 600.

For example, when one of the radars 606, 608, 610 illuminates the collection of radar reflectors 604 in the line 618 or the line 620, the radar reflectors 604 provide a reflection signature back to the radar with seven distinct magnitude peaks over a defined distance, time period, etc. The control circuit can then process the reflection signature and determine that the reflection signature represents a solid, yellow line. For instance, the control circuit may code the reflection signature as a collection of ones (1s) and zeros (0s). In such examples, the control circuit may identify each magnitude peak of the reflection signature by comparing the reflection signature to one or more defined thresholds. The control circuit may then assign a one (or a zero) to each magnitude peak and zeros (or ones) for all other instances (non-peaks) of the reflection signature over a defined time period (e.g., a sampling period). The control circuit may then analyze the collection of ones and zeros (e.g., compare the collection to one or more stored values, etc.) and determine that it corresponds to a solid, yellow line.

Additionally, when one of the radars 606, 608, 610 illuminates the collection of reflectors 604 in the line 622, the radar reflectors 604 provide a reflection signature back to the radar with three sets of three distinct magnitude peaks over a defined distance, time period, etc. Based on this reflection signature, the control circuit can determine that the reflection signature represents a dashed, white line, as explained above. Further, when one of the radars 606, 608, 610 illuminates the collection of reflectors 604 in the line 624, the radar reflectors 604 provide a reflection signature back to the radar with two sets of two distinct magnitude peaks over a defined distance, time period, etc. Based on this reflection signature, the control circuit can determine that the reflection signature represents a solid, white line, as explained above.

Although particular patterns of the radar reflectors 604 are shown and described as representing particular characteristics (e.g., color, dashed, solid, etc.) of the lines, it should be appreciated that other patterns may be used to represent the same or other types of markings if desired. For example, a collection of reflectors 604 may provide a reflection signature with four distinct magnitude peaks, two sets of five distinct magnitude peaks, etc. In such examples, the reflection signature may represent a line for parking (e.g., a parallel parking spot along a side of a road), a line signifying upcoming road construction, or another type of road marking.

In various embodiments, the radiating elements herein may include one or more additional segments for enhancing reflection beamwidth. For example, FIG. 7 illustrates a reflector 700 (e.g., a portion of a reflector) including a pair of radiating elements 706A, 706B each substantially similar to the radiating elements 406 of FIG. 4A, but including additional vertical segments.

More specifically, and as shown in FIG. 7, the reflector 700 generally includes a circuit board (e.g., one or more dielectric substrates) 702, a ground plane 704 extending through the circuit board 702, the radiating elements 706A, 706B, and a transmission line segment 720. The circuit board 702 and the ground plane 704 are similar to the circuit board 402 and the ground plane 404 of FIG. 4A.

Each radiating element 706A, 706B includes opposing side segments (e.g., vertical segments) 714A, 714B, 716A, 716B, a middle segment (e.g., a horizontal segment) 718A, 718B, and an inner vertical segment 722A, 722B. The vertical segments 714A, 714B, 716A, 716B and the middle segments 718A, 718B are similar to the segments 414, 416 and the middle segment 418, respectively, of FIG. 4A. In the example of FIG. 7, each inner vertical segment 722A, 722B extends from its corresponding middle segment 718A, 718B and between its corresponding vertical segments 714A, 714B, 716A, 716B. The inner segments 722A, 722B are then connected together via the transmission line segment 720. For example, the inner vertical segments 722A, 722B may extend to and through a cutout in the ground plane 704 to the transmission line segment 720 on the backside of the circuit board 702.

In various embodiments, the position of the inner vertical segments 722A, 722B may be optimized to maximize the voltage excited at the segments 722A, 722B due to an incident plane wave. For example, the inner vertical segments 722A, 722B may be positioned at mirror images of each other relative to the vertical segments 714A, 714B, 716A, 716B. Specifically, and as shown in in FIG. 7, the vertical segment 722A is positioned closer to the segment 714A than the segment 716A, and the vertical segment 722B is positioned closer to the segment 716B than the segment 714B. In other examples, the inner vertical segments 722A, 722B may be positioned at other suitable mirrored locations if desired.

Due to the configuration between the radiating element 706A, 706B, both radiating elements 706A, 706B may radiate even when only one of the elements 706A, 706B receives energy. For example, instead of all of the energy received by a particular radiating element (e.g., the radiating element 706A) being reradiated by that radiating element itself, a portion of the energy passes along the transmission line segment 720 and excites current on the corresponding mirror image radiating element (e.g., the radiating element 706B), thereby causing it to radiate. As such, in this example, both radiating elements 706A, 706B radiate when only one of the elements 706A, 706B receives energy.

Although the reflector 700 of FIG. 7 is illustrated and described as including two radiating element 706A, 706B having their inner vertical segments 722A, 722B connected together, it should be appreciated that in other embodiments a reflector may include multiple pairs of radiating elements each including inner vertical segments connected together. For example, FIG. 8 illustrates one arrangement of a reflector 800 including multiple pairs of radiating elements 806A, 806B, 836A, 836B, 846A, 846B, 856A, 856B positioned in a single row. In this example, the radiating elements 806A, 806B, 836A, 836B, 846A, 846B, 856A, 856B are similar to the radiating element 706A, 706B of FIG. 7.

As shown, each pair of radiating elements in the row has inner vertical segments connected together via a respective transmission line segment. Specifically, each transmission line segment connects between the inner vertical segments of pairs of radiating elements at mirror image locations, as shown in FIG. 8. In such examples, the transmission line segments have the same electrical length. Due to the transmission line segments being equal length, the radiation contributed from all of the paths along the transmission line segments are in phase in the backscatter direction. This, in effect, may make the reflector 800 somewhat retro-reflective, and increase the range of angles at which it could be seen by an automotive radar (e.g., the radars 606, 608, 610 of FIG. 6).

The reflectors herein may be fabricated in various different manners. FIGS. 9A-H illustrates one example fabrication process in which a low-profile radar reflector (e.g., the low-profile radar reflector 100, etc.) is formed. Although the reflector is shown and described as being fabricated in a particular manner in FIGS. 9A-H, it should be appreciated that the reflectors herein may be fabricated in other suitable manners. For example, radiating elements of reflectors (e.g., the radiating elements 106 of FIGS. 1A-C, the radiating elements 406 of FIGS. 4A-B, etc.) may be fabricated by stamping a flat sheet of metal (such as a copper sheet, an aluminum sheet, etc.) to push out staple-like bridges in a periodic fashion.

With respect to the fabrication process of FIGS. 9A-H, a ground plane 904 is deposited onto a substrate 902 as shown in FIGS. 9A-B. This may be accomplished through, for example, physical vapor deposition such as, electron beam evaporation, sputtering, etc. In such examples, the ground plane 904 may have a thickness of about 1 μm layer, and include gold, aluminum, titanium, alloys thereof, and/or another suitable metallic material (including their alloys). The substrate 902 may be, for example, a silicon wafer (e.g., a 100 mm Si wafer, etc.) and/or another suitable dielectric material.

In various embodiments, a film may be optionally deposited as an adhesion layer between the substrate 902 and the ground plane 904. For example, a thin 10 nm film of chromium or another suitable adhesive material may be deposited on the substrate 902 before the ground plane 904 is added.

Then, a photoresist material 906 is applied to the ground plane 904 to form a substrate, as shown in FIG. 9C. In various embodiments, the photoresist material 906 may be spun onto the ground plane 904 at about a thickness of approximately 250 μm. In some examples, the photoresist material 906 may be a SU-8 photoresist and/or another suitable dielectric material. In various embodiments, an adhesion promotor (e.g., OmniCoat, etc.) may be applied to the ground plane 904 before spinning or otherwise applying the photoresist material 906 onto the ground plane 904.

Next, multiple dielectric strips 908A, 908B, 908C are formed from the photoresist material 906 on the ground plane 904. The strips 908A, 908B, 908C may be formed through conventional processes such as, for example, a photolithography process. For instance, the photoresist material 906 may be patterned above the ground plane 904 to form the strips 908A, 908B, 908C, thereby exposing portions of the ground plane 904 therebetween as shown in FIG. 9D. For example, FIG. 10 illustrates one example arrangement of the substrate 902, the ground plane 904, and sixteen dielectric strips (collectively 908) formed in FIG. 9D.

A shadow mask 910 is then applied on top of the strips 908A, 908B, 908C as shown in FIG. 9E. In various embodiments, the shadow mask 910 may be fabricated using deep reactive ion etching to etch completely through another substrate (e.g., another silicon wafer) to form multiples slots. For example, FIG. 11 illustrates one example of the shadow mask 910 including sixteen slots 1102. Although the shadow mask 910 of FIG. 11 is shown with sixteen slots, it should be appreciated that the shadow mask 910 may include more or less slots depending on the number of desired radiating elements in the reflector. When the shadow mask 910 is applied on top of the strips 908A, 908B, 908C, the slots extend perpendicular to the strips 908A, 908B, 908C. As such, each slot provides an opening exposing portions of the strips 908A, 908B, 908C and portions of the ground plane 904 therebetween.

Then, radiating elements are deposited, formed, etc. on the strips 908A, 908B, 908C, as shown in FIGS. 9F-G. In various embodiments, the radiating elements may be deposited on the strips 908A, 908B, 908C through a physical vapor deposition method, such as electron beam evaporation, sputtering, etc. or another suitable deposition method. For example, as shown in FIG. 9F, side segments 914 of the radiating elements are formed on side surfaces of the strips 908A, 908B, 908C and portions of middle segments 918 of the radiating elements are formed on a top surface of the strips 908A, 908B, 908C through the slots of the shadow mask 910. In such examples, the side segments 914 contact the ground plane 904. In various embodiments, the side segments 914 and the portions of the middle segments 918 are formed at a defined angle (as shown by arrows 912A in FIG. 9F). The defined angle may be, for example, between about 30° and about 70° relative to the ground plane 904.

Next, and as shown in FIG. 9G, side segments 916 of the radiating elements are formed on other side surfaces of the strips 908A, 908B, 908C and other portions (e.g., the remaining portions) of the middle segments 918 of the radiating elements are formed on the top surface of the strips 908A, 908B, 908C through the slots of the shadow mask 910. In such examples, the side segments 916 contact the ground plane 904. In FIG. 9G, the side segments 914 and the portions of the middle segments 918 are formed at a defined angle (as shown by arrows 912B). The defined angle may be, for example, between about −30° and about −70° relative to the ground plane 904.

As shown in FIG. 9H, the shadow mask 910 is then removed leaving the radiating elements having the side segments 914, 916, and the middle segments 918 on the strips 908A, 908B, 908C.

The low-profile radar reflectors herein leverage unique, staple-like shaped radiating elements, thereby enabling the reflectors to reradiate with a large RCS and backscatter largely in VV (vertical transmit and vertical receive) polarization. For example, and as explained above, the reflectors herein reradiate at an RCS of −15 dBsm or more when a vertically-polarized incident wave is provided with a frequency between 76 GHz and 81 GHz and an incidence angle between about 77° and about 86°. With this reradiation, forward-looking automotive radars are able to easily detect the reflectors regardless of weather conditions and enable the identification of various road markings.

While the reflectors herein are described as being designed with respect to the 76 GHz-81 GHz frequency band, it should be appreciated that the reflectors may be modified to operate at other desired frequency bands. For example, the reflectors herein may be modified by scaling the dimensions (e.g., the width W, the height H, the length L, the distances S1, S2, etc. of and/or associated with the radiating elements 106, 406 of FIGS. 1A-C and/or 4A-B) proportionally to the wavelength.

Also, testing has shown that the reflectors reradiate with a sufficient RCS even when the reflectors are covered by, for example, lane paint, lane stickers, and/or debris. For example, testing showed that paper towels and foam had little effect on the RCS, while plastic reduced the RCS appreciably. However, if plastic was resting on top of foam, that impact was reduced. Additionally, standing water on its own will eliminate the signal. As such, in some examples, it may be desirable to place a particular set of layers of materials over the reflector such as foam and then plastic. This may help prevent standing water from settling on top of the reflector, while still providing good RCS. In other examples, lane paint or lane stickers may potentially provide a barrier layer to prevent standing water from settling on top of the reflector.

Additionally, the radar reflectors leverage the unique, staple-like shaped radiating elements to ensure a low-profile and physically small configuration. For example, and as explained herein, the reflectors have a total height of less than half a millimeter (e.g., 200 μm, 250 μm, 260 μm, etc.), which is substantially thinner than conventional reflectors for such applications. Further, the reflectors generally have a surface area of about 3 cm by about 3 cm. Due to their configuration, the reflectors experience little to no impact or risk of damage from traffic when placed on a surface of a road. As such, the reflectors are not required to be embedded into a surface of a road.

Further, the radar reflectors may be easily fabricated with minimal components and costs. As such, the radar reflectors are amenable to cost-effective, mass production for use in existing and/or new roadways.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from A to about B" is inclusive of A and B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A low-profile radar reflector configured to reradiate when illuminated by a vertically-polarized incident wave generated by an automotive radar, the low-profile radar reflector comprising:
    a ground plane;
    a dielectric substrate including a top surface and a bottom surface opposing the top surface; and
    a plurality of radiating elements positioned on the dielectric substrate, each radiating element including opposing vertical metallic side segments connected to the ground plane, and a horizontal metallic segment extending between the opposing vertical metallic side segments and along the top surface of the dielectric substrate, wherein the horizontal metallic segment of said each radiating element has a defined length such that, when the radiating element is illuminated by the vertically-polarized incident wave from the automotive radar, each radiating element is at its resonance causing currents in the opposing vertical metallic side segments to flow in the same direction and reradiates back to the automotive radar.

2. The low-profile radar reflector of claim 1, wherein the low-profile radar reflector is configured to reradiate at a radar cross-section of −15 dBsm or more when an incidence angle of the vertically-polarized incident wave is between 77° and 86°.

3. The low-profile radar reflector of claim 1, wherein one of the opposing vertical metallic side segments and a portion of the horizontal metallic segment of said each radiating element functions as a monopole antenna, and wherein the other one of the opposing vertical metallic side segments and the remaining portion of the horizontal metallic segment of said each radiating element functions as another monopole antenna.

4. The low-profile radar reflector of claim 1, wherein the defined length of the horizontal metallic segment of said each radiating element is about half of a wavelength ($\lambda/2$) when the vertically-polarized incident wave has a frequency between 76 GHz and 81 GHz and an incidence angle between 77° and 86°.

5. The low-profile radar reflector of claim 1, wherein a height of said each radiating element relative to the ground plane is between about 200 µm and about 260 µm.

6. The low-profile radar reflector of claim 1, wherein a width of said each radiating element is about 250 µm.

7. The low-profile radar reflector of claim 1, wherein the dielectric substrate includes a plurality of strips having opposing side surfaces, and wherein the opposing vertical metallic side segments of said each radiating element extend along the opposing side surfaces of the plurality of strips.

8. The low-profile radar reflector of claim 1, wherein the dielectric substrate defines vias extending between the top surface and the bottom surface, and wherein the opposing vertical metallic side segments of said each radiating element extend through the vias of the dielectric substrate.

9. The low-profile radar reflector of claim 1, wherein the ground plane is positioned on the bottom surface of the dielectric substrate.

10. The low-profile radar reflector of claim 1, wherein:
    the ground plane is positioned within the dielectric substrate;
    said each radiating element includes an inner vertical metallic segment between the opposing vertical metallic side segments, extending from the horizontal metallic segment to and though the ground plane within the dielectric substrate;
    the inner vertical metallic segment of a first radiating element of the plurality of radiating elements is connected by a first transmission line segment to the inner vertical metallic segment of a second radiating element of the plurality of radiating elements to form a first connected pair of radiating elements; and
    the first radiating element and the second radiating element of the first connected pair of radiating elements are in a mirror image position of each other.

11. The low-profile radar reflector of claim 1, wherein:

the inner vertical metallic segment of a third radiating element of the plurality of radiating elements is connected by a second transmission line segment to the inner vertical metallic segment of a fourth radiating element of the plurality of radiating elements to form a second connected pair of radiating elements; and a length of the first transmission line segment and the second transmission line segment are equal.

12. The low-profile radar reflector of claim 1, wherein the low-profile radar reflector is configured to embed into paint or a sticker on a surface of a road.

13. The low-profile radar reflector of claim 12, wherein the low-profile radar reflector is configured to provide an indication of a type of lane marking when embedded into the paint or the sticker on the surface of the road.

14. The low-profile radar reflector of claim 1, wherein the dielectric substrate includes at least one strip, wherein the plurality of radiating elements are separated from each along the at least one strip by a multiple of half of a wavelength ($\lambda/2$) when the vertically-polarized incident wave has a frequency between 76 GHz and 81 GHz and an incidence angle between 77° and 86°.

15. The low-profile radar reflector of claim 14, wherein a distance between two adjacent radiating elements of the plurality of radiating elements on the at least one strip is one wavelength ($\lambda$) when the vertically-polarized incident wave has a frequency between 76 GHz and 81 GHz and an incidence angle between 77° and 86°.

16. The low-profile radar reflector of claim 1, wherein the dielectric substrate includes a first strip and a second strip separated from and extending adjacent to each other, wherein a first set of the plurality of radiating elements are positioned on the first strip and a second set of the plurality of radiating elements are positioned on the second strip, and wherein a distance between the first set of the plurality of radiating elements and the second set of the plurality of radiating elements is about half of a wavelength ($\lambda/2$) or more when the vertically-polarized incident wave has a frequency between 76 GHz and 81 GHz and an incidence angle between 77° and 86°.

* * * * *